Figure 1:
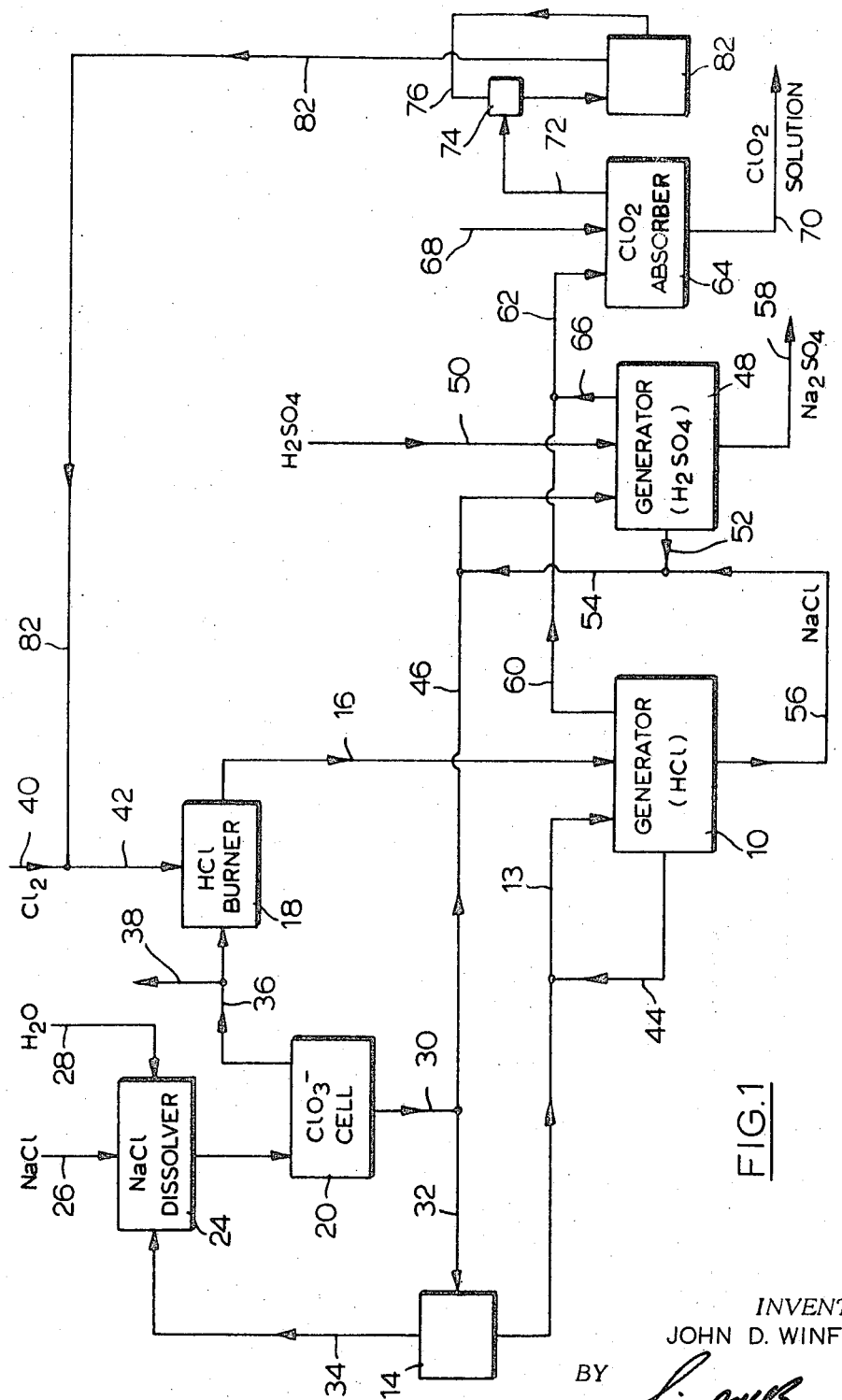

| United States Patent [19] | [11] 3,829,557 |
| Winfield | [45] Aug. 13, 1974 |

[54] PRODUCTION OF CHLORINE DIOXIDE

[75] Inventor: John D. Winfield, Etobicoke, Ontario, Canada

[73] Assignee: ERCO Industries Limited, Islington, Ontario, Canada

[22] Filed: July 28, 1971

[21] Appl. No.: 166,773

Related U.S. Application Data

[62] Division of Ser. No. 45,850, June 12, 1970, abandoned.

[52] U.S. Cl.............. 423/478, 423/499, 423/504, 423/552, 252/187 R
[51] Int. Cl. ..................... C01b 7/04, C01b 11/02
[58] Field of Search ........ 23/152, 89, 121; 252/187; 423/478, 477, 499, 552, 504

[56] References Cited
UNITED STATES PATENTS

| | | | |
|---|---|---|---|
| 2,664,341 | 12/1953 | Kesting | 23/152 |
| 2,861,871 | 11/1958 | Germano | 423/478 |
| 3,404,952 | 10/1968 | Westerlund | 423/478 |
| 3,446,584 | 5/1969 | Fuller | 23/121 |
| 3,516,790 | 6/1970 | Westerlund | 23/152 |
| 3,563,702 | 2/1971 | Partridge et al. | 423/478 |

FOREIGN PATENTS OR APPLICATIONS

| 668,062 | 12/1965 | Kenya | 423/478 |

*Primary Examiner*—Edward Stern
*Attorney, Agent, or Firm*—Sim & McBurney

[57] ABSTRACT

Chlorine dioxide is produced in a two-stage operation. In the first stage sodium chlorate and hydrochloric acid are reacted in aqueous solution at elevated temperature to form a gaseous mixture of chlorine dioxide, chlorine and evaporated water vapor and to form sodium chloride in the reaction zone of the first stage. In the second stage, a second reaction solution is formed containing sodium chlorate, sodium chloride and sulphuric acid, the sodium chloride being constituted at least in part by the sodium chloride formed in the first stage. Sodium sulphate and a gaseous mixture of chlorine dioxide, chlorine and water vapor are formed upon heating the second reaction solution. Chlorine dioxide is recovered from the gaseous mixtures formed in the two stages.

7 Claims, 2 Drawing Figures

PRODUCTION OF CHLORINE DIOXIDE

This application is a division of application Ser. No. 45,850 filed June 12, 1970, now abandoned.

The present invention relates to the production of chlorine dioxide.

Chlorine dioxide is known to be prepared in a variety of ways, involving the reduction of an alkali metal chlorate, generally sodium, utilizing sulphur dioxide, sulphuric acid, chromic sulphate, methanol, sodium chloride and hydrochloric acid as reducing agents. The basic reaction in all such processes is that between chlorate and chloride in the acid solution to produce chlorine dioxide, chlorine and water, in accordance with the equation:

$$HClO_3 + HCl \rightarrow ClO_2 + \tfrac{1}{2}Cl_2 + H_2O$$

The present invention is concerned with a two-stage process of making chlorine dioxide where the reducing agent in the first stage is hydrochloric acid and in the second stage is sulphuric acid.

The basic reactions involved in the first stage are, in the case where the alkali metal is sodium:

1. — $NaClO_3 + 2HCl \rightarrow ClO_2 + \tfrac{1}{2}Cl_2 + NaCl + H_2O$
and
2. — $NaClO_3 + 6HCl \rightarrow NaCl + 3Cl_2 + 3H_2O$ The two reactions are competing in the reaction solution and reaction (2) becomes significant in cases when there is an excess of hydrochloric acid above the stoichiometry of the equation (1) in the feed stream to the reaction vessel. Where such an excess of hydrochloric acid exists, therefore, the quantity of chlorine dioxide produced per mole of sodium chlorate decomposed is reduced. In order to maximize chlorine dioxide production using hydrochloric acid, it is preferred to operate at or near the stoichiometry of equation (1) in the feed to the reactor.

Chlorine dioxide is produced commercially from hydrochloric acid by the so-called Day-Kesting process disclosed in Canadian Pat. No. 461,586 issued Dec. 6, 1947 to Brown Company. In this process the chlorine dioxide generator consists of a plurality of, generally six, reaction vessels arranged in series. Feed liquor containing sodium chlorate, hydrochloric acid and some sodium chloride is fed into the upper of the six reactors, from which the solution cascades by gravity through the remaining reactors. The two bottom reactors are operated at boiling temperature and the steam strips them of chlorine dioxide while the remaining hydrochloric acid is oxidized. Air is introduced into the gas stream from the last two reactors, mixes with the vapour and is bubbled countercurrently through the solution in the reactors three to six.

In accordance with the present invention, in the first stage, chlorine dioxide is produced from an aqueous reaction medium containing an alkali metal chlorate and hydrochloric acid contained in a reaction vessel. Water is evaporated from the reaction medium in the vessel and removes the chlorine dioxide and chlorine from the vessel.

This process of production of chlorine dioxide using hydrochloric acid as reducing agent is described and claimed broadly in parent application Ser. No. 45,850 out of which this application is divided. The present invention relates to a particular process embodying the broad concept of the present application.

Thus, in the process of the present invention, in the first step, chlorine dioxide and chlorine is produced in a single vessel and is removed from the vessel solely with the aid of steam evaporated from the aqueous reaction medium.

It has previously been proposed in Canadian Pat. No. 782,574 issued Apr. 9, 1968 to Chemech Engineering Limited, to produce chlorine dioxide and chlorine from sodium chloride and hydrochloric acid in a single reaction vessel in place of the cascade six-vessel system used in the Day-Kesting process. In the process described in the above patent, gaseous hydrogen is passed through the reaction vessel to agitate the reaction liquor and as gaseous diluent for the chlorine dioxide and chlorine.

Chlorine dioxide gas in concentrated amounts is spontaneously explosive and in processes of producing chlorine dioxide it is necessary to make some provision for diluting the gases produced in the reaction. Air has commonly been used, as in the commercial Day-Kesting operation described above, and in the Canadian Pat. No. 782,574, hydrogen is the diluent gas. The gaseous stream from the reactor used in Canadian Pat. No. 782,574 contains water vapour in addition to the chlorine dioxide, chlorine and hydrogen.

In the present invention, steam is the sole diluent carrier gas for the gaseous reaction products. Such operation is advantageous over the hydrogen inert gas used in the above patent, since there is a danger of explosion of the gas mixture containing chlorine dioxide, chlorine and hydrogen, albeit reduced with regard to the danger of explosion where undiluted chlorine dioxide is involved, but by no means an insignificant danger. By contrast, operation in accordance with the present invention substantially eliminates the possibility of explosion.

In addition, operation by the use of steams reduces the overall volume of gas to be handled, as compared to the hydrogen stripping operation described above. Further, less elaborate equipment is required in the operation of the present invention as compared with the operation described in Canadian Pat. No. 782,574.

It will be apparent therefore that the use of the particular hydrochloric acid-based system of the parent application in this invention gives rise to considerable advantages of prior art systems of producing chlorine dioxide from sodium chlorate and hydrochloric acid.

In many pulp mill installations, the chlorine dioxide generator is sulphuric acid based, thereby producing sodium sulphate as by-product. Such sodium sulphate is used makeup for sulphur and sodium values in the conventional recovery operations in which the black liquor from the digestion of the pulp with white liquor containing sodium sulphide and sodium hydroxide, is concentrated and sodium sulphate is added to the concentrated liquor prior to burning in a furnace. The smelt is dissolved in water, and the resulting green liquor caustic with lime to precipitate calcium carbonate to regenerate the white liquor. As indicated above, with increasing recovery of sodium and sulphur values from the flue of the furnace, the quantity of sodium sulphate required as make-up falls. A chlorine dioxide generator, therefore, may produce more by-product sodium sulphate than is required in the Kraft mill.

The present invention provides a method of production of chlorine dioxide which increases the chlorine dioxide capacity while decreasing the quantity of sodium sulphate produced per limit quantity of chlorine dioxide.

A single vessel chlorine dioxide generator based on hydrochloric acid, as disclosed above, is used in accordance with this invention in conjunction with an existing chlorine dioxide generator based on sulphuric acid.

Sulphuric acid-based systems involve the following reactions:

1. $MClO_3 + MCl + H_2SO_4 \rightarrow ClO_2 + \frac{1}{2}Cl_2 + M_2SO_4 + H_2O$
2. $MClO_3 + 5MCl + 3H_2SO_4 \rightarrow 3Cl_2 + 3M_2SO_4 + 3H_2O$ Where M is an alkali metal. The equation (2) becomes significant when the mole ratio of chloride to chlorate exceeds 1:1 in the feed to the reactor. Since no chlorine dioxide is produced by the process of equation (2), to maximize production of chlorine dioxide, it is preferred to operate at an approximately equimolar ratio of chlorate to chloride in the feed to the reactor.

In the present invention, the sodium chloride formed in the first stage is used to provide at least part of the sodium chloride content of the second stage. This may be carried out in two alternative manners, namely, firstly, with precipitation of sodium chloride from the reaction mixture in the first stage, and, secondly, without precipitation of sodium chloride.

In the first alternative, the first-stage, a hydrochloric acid-based, process is carried out under conditions such as to deposit in the reaction vessel sodium chloride, the product of the chlorine dioxide producing reaction. The sodium chloride so deposited is used, at least partially, as at least part of the sodium chloride requirement of the second stage, or sulphuric acid-based, process.

In practice, the first stage process is carried out at the boiling temperature of the reaction liquor. Operating in this manner ensures maximum vapourization of water from the reaction solution in the vessel, whereby chlorine dioxide and chlorine are rapidly educed from the vessel. The temperature of the reaction solution should be below the temperature above which substantial decomposition of chlorine dioxide occurs. It is preferred to operate the reaction vessel at temperatures of approximately 60° to 80°C. In order to maintain the reaction solution in a boiling state in this temperature range, the reaction vessel is subjected to a reduced pressure. The magnitude of the reduced pressure is dependent upon the boiling temperature required.

Any convenient equipment may be utilized to subject the reaction vessel to a reduced pressure, for example, a water jet eductor may be used. The water fed to the eductor serves not only to produce the required reduced pressure, but also to condense the water vapour and to dissolve the chlorine dioxide and part of the chlorine produced.

A variety of reaction vessels may be utilized in the practice of the present invention. A suitable one is described in Canadian Pat. No. 825,084 issued Oct. 14, 1969, to Electric Reduction Company of Canada, Limited. Such Canadian Patent describes the production of chlorine dioxide from an alkali metal chlorate, an alkali metal chloride and sulphuric acid in a single vessel generator-evaporator-crystallizer.

It is preferred to operate the first stage process at molar concentrations where the ratio of $Cl^- : ClO_3^-$ is approximately 2:1. It is possible to use lower ratios, say 1:1, but all of the chlorate present is not reacted under these circumstances. It also is possible to use higher ratios of chloride to chlorate, say 5:1, but at these concentrations, equation (2) above becomes predominant, producing large quantities of chlorine in preference to chlorine dioxide.

The acidity of the reacting solution in the vessel of the first stage process is generally below 1N, preferably about 0.5N. In one particularly preferred embodiment described below the acidity may drop to 0.1 to 0.2N. The effective range of acidities in the first stage process is generally 0.05 to 1N.

The quantity of water evaporated from the reacting solution in the first stage, in accordance with the first alternative the present invention, is sufficient to precipitate sodium chloride in the reaction vessel.

The precipitation of sodium chloride in the first stage reaction vessel may be induced by feeding substantially concentrated solutions of sodium chlorate and hydrochloric acid to the reaction vessel. Upon reaction between the sodium chlorate and the hydrochloric acid and upon evaporation of water, sodium chloride precipitates out of the reaction liquor in the vessel. The vessel, therefore, operates as a single vessel generator-evaporator-crystallizer.

It further has been found that it is possible to operate the process at extremely low acidities of the order of 0.1 to 0.2N and precipitate sodium chloride from the solution. The acidity of the reaction solution will attain a steady state when the process is operated continuously. The acidity of the reaction medium will depend upon a number of factors such as initial concentration of feeds, temperature and quantity of water evaporated off.

Some spent reaction liquor may overflow from the reaction vessel and is recycled to the make-up feed streams. The precipitated crystalline sodium chloride is removed from the reaction vessel and washed with water to remove last traces of trapped reaction medium. This latter step may be omitted if desired, since the sodium chlorate and hydrochloric acid values trapped in the solid sodium chloride are compatible with the materials present in the reactor of the second stage. The spent wash water may be fed along with the recycled reaction medium to the reaction vessel. The sodium chloride thereby is recovered in a substantially pure state. In accordance with the present invention, at least part of this sodium chloride is used as at least part of the chloride requirement of the second stage sulphuric acid-based process.

It is preferred to operate the process continuously. Thus, an aqueous solution of sodium chlorate and a separate stream of hydrochloric acid are continuously fed to a reaction vessel subjected to a reduced pressure and containing boiling reaction liquid. Chlorine dioxide, chlorine and water vapour are continuously removed from the reaction vessel and sodium chloride is continuously precipitated in the reaction vessel. Overflow spent reaction liquor may be continuously removed from the reaction vessel and make-up sodium chlorate solution continuously added thereto, and the overflow spent liquor together with make-up sodium chlorate solution are continuously fed to the reaction vessel as the sodium chlorate stream. Sodium chloride is continuously removed from the reaction vessel.

In the second alternative process, the process is carried out under such conditions that precipitation of the sodium chloride in the first stage does not occur.

The effluent from the first stage reactor in this case contains sodium chloride and unreacted sodium chlorate and hydrochloric acid. The whole or part of the effluent is passed to the second stage reactor and the sodium chloride and unreacted hydrogen chloride form at least part of the chloride requirements and the unreacted sodium chlorate provides part of the chlorate requirement. Additional quantities of sodium chlorate and sodium chloride may be added to raise the concentrations of these materials in the second stage reaction medium to the desired level.

The hydrochloric acid feed for the reaction vessel operating in the first stage of the process of the present invention may be purchased as such, prepared from purchased hydrogen chloride gas, or preferably formed by combusting purchased chlorine with hydrogen off-gas from a chlorate cell and then dissolving the hydrogen chloride in water. In some operations it may be desirable to feed hydrogen chloride gas directly into the reaction vessel. Some of the chlorine used to combust with the hydrogen may be supplied by chlorine generated in the overall process.

The reaction occuring in the chlorate cell is, turning now to the second stage, a method of operating a sulphuric acid-based generation system used commercially is known as the "Rapson R2" process, also known as the "Hooker-R2" and "ER2" processes. This process is disclosed in Canadian Pat. No. 543,589 issued July 16, 1957 to Electric Reduction Company of Canada, Limited and involves introduction into a generator of a stream of an aqueous solution of approximately equimolar proportions of an alkali metal chlorate and an alkali metal chloride and a stream of concentrated sulphuric acid. Air is introduced at the bottom of the generator to carry chlorine dioxide and chlorine produced in the generator out of the generator to further processing to separate the chlorine dioxide from the chlorine. The aqueous effluent of the generator contains an alkali metal bisulphate and unreacted alkali metal chlorate, alkali metal chloride and sulphuric acid. The bisulphate may be crystallized and the mother liquor returned to the generator. The alkali metal in accordance with this invention is sodium.

The R2 process generally is carried out under conditions of high acidity, usually about 10N. In accordance with an invention described in Canadian Pat. No. 826,517 issued Nov. 4, 1969 to Electric Reduction Company of Canada, Limited, chlorine dioxide and chlorine can be obtained by reacting sodium chlorate, sodium chloride and sulphuric acid under conditions of low acidity, generally of the order of 2 to 4.8N. The effluent from the generator in this case contains sodium sulphate ($Na_2SO_4$) in addition to unreacted sodium chlorate, sodium chloride and sulphuric acid. The sodium sulphate may be recovered either by evaporating the solution, in which case the sodium sulphate is recovered as anhydrous sodium sulphate, or by cooling the solution, in which case the sodium sulphate is recovered as sodium sulphate decahydrate ($Na_2SO_4 \cdot 10H_2O$). The mother liquor then is recycled to the generator.

In the above-mentioned Canadian Pat. No. 825,084, there is described a process of forming chlorine dioxide and chlorine from an alkali metal chlorate, alkali metal chloride and sulphuric acid, in which chlorine dioxide and chlorine are generated and an alkali metal sulphate crystallized in the same vessel. This may be achieved by operating the generator at the boiling point of the reactants under reduced pressure. The water evaporated thereby serves to remove the chlorine dioxide and chlorine from the vessel.

The alkali metal sulphate is recovered from the vessel and the reaction liquor recycled to the generator inlet.

The alkali metal in accordance with this invention is sodium. The form of sodium sulphate produced is dependent on the acidity of the reacting liquor. At high acidities around 10 to 12N, the sodium sulphate is in the form of sodium bisulphate ($NaHSO_4$) whereas at acidities around 5 to 6N the sodium sulphate is in the form of sodium sesquisulphate ($Na_3H(SO_4)_2$) or a mixture of sodium bisulphate with sodium sesquisulphate.

The process disclosed in Canadian Pat. No. 826,577 is preferably performed in a single vessel generator-evaporator-crystallizer wherein the weakly acid solution is reacted at the boiling point of the solution under reduced pressure. The water vapour removes the chlorine dioxide and chlorine from the vessel. Under the conditions of low acidity, ie., about 2 to 4.8N, the sodium sulphate deposited is generally anhydrous sodium sulphate ($Na_2SO_4$), possibly mixed with some sodium sesquisulphate at the high end of the acidity range.

Figure 2:
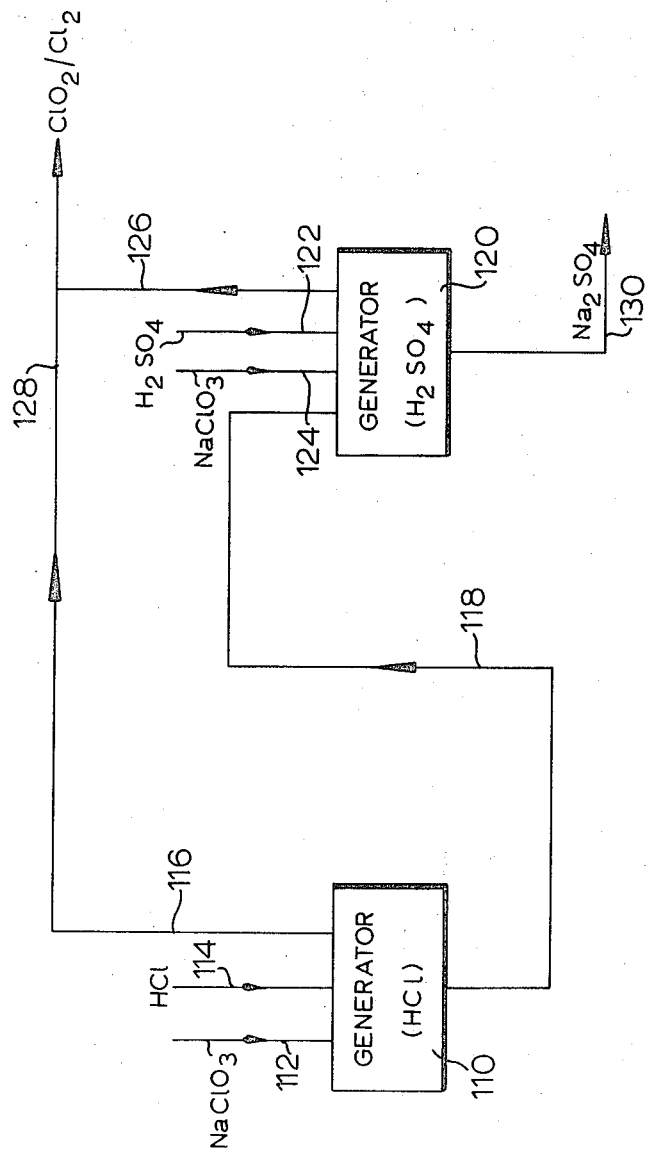

The present invention is further described by way of example with reference to the accompanying drawing, in which, FIG. 1 represents a flow sheet for an integrated system in accordance with one embodiment of the present invention, and FIG. 2 represents a flow sheet for an integrated system in accordance with another embodiment of the present invention.

The hydrochloric acid-based system of the present invention may be combined with any of the above-described sulphuric acid systems in a variety of ways.

In the embodiment of FIG. 1, a chlorine dioxide generator 10, such as the one described in Canadian Pat. No. 825,084, contains a boiling aqueous reaction medium of sodium chlorate and hydrochloric acid. The generator is maintained under a reduced pressure. A concentrated solution of sodium chlorate is fed to the generator 10 through line 12 from a chlorate concentrator 14. Hydrogen chloride, or hydrochloric acid, if desired, is fed to generator 10 through line 16 from hydrogen chloride burner 18.

A chlorate cell 20 produces sodium chlorate solution by electrolysis of sodium chloride solution fed through line 22 from a sodium chloride dissolver 24. Sodium chloride is fed to the dissolver 24 through line 26 and water is fed to the dissolver through line 28.

Liquid effluent from the chlorate cell consisting of sodium chlorate and unreacted sodium chloride leaves the cell through line 30. Part of the effluent is fed through line 32 to the concentrator 14. The solution is concentrated to precipitate some sodium chloride and to provide a concentrated sodium chlorate solution. The sodium chloride is recycled to the dissolver 24 through line 34, and the sodium chlorate solution fed to the generator 10 through line 12.

Gaseous products of the chlorate cell, consisting substantially of hydrogen, leave the cell through line 36. Two-thirds of the mole amount of hydrogen leaves the system through line 38 for further utilization, such as to be burned with oxygen to produce heat which can be utilized as part of the heat requirement of the system, or to be fed to a fuel cell also fed with oxygen, to thereby generate electrical energy.

The remaining one-third of the mole quantity of hydrogen is fed to the hydrogen chloride burner 18. Chlorine is fed to the burner through lines 40 and 42. The chlorine burns with the hydrogen to produce hydrogen chloride which is fed as such, as hydrochloric acid after absorption in water, through line 16 to the generator 10.

The liquid level in the generator 10 is maintained substantially constant by adjusting appropriately feed rates and evaporation rates. Overflow liquor from the generator, consisting of unreacted sodium chlorate and hydrochloric acid, is recycled through line 44 to the sodium chlorate feed stream 12.

The sodium chlorate- and sodium chloride-containing effluent from the cell 20 is partially fed through line 46 to a chlorine dioxide generator 48. Generator 48, such as the one described in Canadian Pat. No. 825,084, contains a boiling aqueous reaction mixture of sodium chlorate, sodium chloride and sulphuric acid. The generator 48 is maintained under a reduced pressure. Sulphuric acid is fed to the reaction mixture through line 50. The level of the reaction mixture is maintained substantially constant within the generator 48 by appropriate adjustment of flow rates and rate of evaporation of water and overflow liquid containing unreacted sodium chlorate, sodium chloride and sulphuric acid is recycled to the sodium chlorate feed stream 46 through lines 52 and 54.

In the generator 10, sodium chloride is crystallized out of the reaction medium. This sodium chloride is fed through lines 56 and 54 to the sodium chlorate feed stream 46 of the generator 48. The sodium chloride product of the hydrochloric acid-based generator 10 is used as the sodium chloride feed for the sulphuric acid-based generator 48.

Sodium sulphate is crystallized out of the reaction medium in the generator 48 and exits through line 58, generally for feed to the Kraft mill recovery operation. The form of the sodium sulphate will depend upon the acidity of the reaction medium, as indicated above.

Gaseous products of generator 10, consisting of chlorine dioxide, chlorine and water vapour, are fed through lines 60 and 62 to a chlorine dioxide absorber 64. Gaseous products of generator 48, consisting of chlorine dioxide, chlorine and water vapour, pass out of the generator 48 through line 66 and are fed to the chlorine dioxide absorber 64 through line 62.

Water is fed to the chlorine dioxide absorber 64 through line 68. The water serves to dissolve the chlorine dioxide and part of the chlorine and to condense a substantial part of the steam. The liquid effluent, consisting of an aqueous solution of chlorine dioxide containing some chlorine, passes out of the absorber through line 70. The chlorine dioxide solution may be fed to the bleaching plant of the mill.

Undissolved chlorine and remaining water vapour pass out of the absorber 64 through line 72 to a vacuum inducing device 74. The vacuum inducing device may be of any convenient construction, such as a venturi tube or a rotary pump.

The chlorine and remaining water vapour are contacted with recycled chlorine water fed through line 76 to the vacuum inducing device 74. The remaining water vapour thereby is condensed and the liquid products, together with gaseous chlorine, pass through line 78 to a separator 80. The gaseous chlorine is vented from the separator 80 through line 82 to the chlorine feed line 42 of the hydrogen chloride burner 18. The liquid in the separator 80 is recycled through line 76 to vacuum inducing device 74.

Chlorine water may be tapped from the separator 282 from time to time if the accumulation in separator 282 becomes too large and utilized in the bleaching plant of the mill.

It can be seen therefore that the present invention provides an integrated system for the production of chlorine dioxide from both hydrochloric acid- and sulphuric acid-based systems in which the only stock materials required are sodium chloride, chlorine and sulphuric acid and the only effluents are chlorine dioxide solution, which is utilized in the bleaching plant and sodium sulphate, which is utilized in the Kraft recovery system. Chlorine water also may form part of the effluents from time to time.

It can be seen that the quantity of sodium sulphate produced is halved for the same quantity of chlorine dioxide, as compared to the conventional sulphuric acid-based operation.

It is not necessary that the chlorine dioxide be produced in the ratio 50:50 from each generator. It is possible to vary the ratio, depending on the quantity of sodium sulphate required in the Kraft mill recovery system. Thus, if more sodium sulphate is required than is produced by the operation as described above with reference to FIG. 1, then more chlorate is fed through line 46 than is fed through line 32. More sodium chloride will be required by generator 48 than would be supplied by generator 10 and a separate supply line would be necessary.

Alternatively, if less sodium sulphate is required, the proportion of the chlorate effluent from the cell 20 fed through line 32 is increased. This will give rise to an excess of sodium chloride produced in generator 210 over the requirement of the generator 48. The excess can be simply recycled to the sodium chloride feed line 26. Alternatively the excess may be utilized to form sodium by dioxide.

In many bleaching operations involving bleaching with chlorine and chlorine dioxide, the pulp after each bleaching step is subjected to caustic extraction with sodium hydroxide solution. The sodium hydroxide solution often is prepared on site by electrolysis of sodium chloride solution in a caustic cell, and the process sodium chloride may be used to form this sodium chloride solution.

The sulphuric acid generator 48 may be a standard Rapson R2 generator, in place of the single vessel generator-evaporator-crystallizer 48. An air line is necessary in this modification to remove the chlorine dioxide and chlorine. Facility for crystallizing the sodium sulphate also is required.

Further, the generator 10 may be operated without deposition of sodium chloride as described below with reference to FIG. 2.

It is possible to operate the system described above with reference to FIG. 1 with purchased sodium chlorate and purchased hydrogen chloride. Alternatively, where sodium chlorate is purchased, and thus no hydrogen is available as by-product, hydrogen may be purchased along with chlorine to combust together on site. The hydrogen and chlorine may be reacted together in a fuel cell in place of the burner 18, thereby recovering electrical energy. Where a chlorate cell is provided, it may be more practicable under certain circumstances to use purchased hydrogen chloride and burn all of the hydrogen off-gas from the chlorate cell in oxygen and use the heat generated in the system.

Turning now to FIG. 2, a chlorine dioxide generator 110, such as the one described in Canadian Pat. No. 825,084, contains a boiling aqueous reaction medium of sodium chlorate and hydrochloric acid. The generator 110 is maintained under a reduced vacuum in any desired manner.

A solution of sodium chlorate is fed to the generator 110 by line 112. Hydrochloric acid, or hydrogen chloride, if desired, is fed to the generator 110 by line 114. The sodium chlorate solution may be produced in any convenient manner, such as, a chlorate cell in which an aqueous sodium chloride solution is electrolyzed.

Chlorine dioxide and chlorine are formed in the generator 110 and are removed by steam evaporated from the reacting solution by line 116. The other product of the reaction is sodium chloride and, in accordance with this embodiment, insufficient water is evaporated from the reaction medium to cause precipitation of the sodium chloride.

The spent reaction liquor containing sodium chloride and unreacted sodium chlorate and hydrochloric acid is fed by line 118 to a sulphuric acid based generator 120. Generator 120, such as the one described in Canadian Pat. No. 825,084 contains a boiling aqueous reaction mixture of sodium chlorate, sodium chloride and sulphuric acid. The generator 120 is maintained under a reduced pressure by means (not shown). Sulphuric acid is fed to the generator 120 by line 122.

The sodium chloride in the spent reaction liquor fed by line 118 to the generator 120 forms at least part of the sodium chloride requirement of that generator. In addition the unreacted sodium chlorate and hydrochloric acid in the spent reaction liquor provide part of the chlorate and chloride requirements of the generator 120. Appropriate amounts of sodium chlorate are fed by line 124 together with sodium chloride, if required, to maintain an approximately 1:1 molar ratio of chlorate:chloride in the generator 120. The chloride content is measured as including chloride from both sodium chloride and the hydrochloric acid.

The level of the reaction mixture in the generator 120 is maintained substantially constant by appropriate adjustment of flow rates and rate of evaporation of water. Any overflow liquid may be recycled to the chlorate feed line 124.

Gaseous products of the generator 120, namely chlorine dioxide and chlorine, are removed from the generator 120 by steam evaporated from the reaction mixture through line 126 to mix with the gaseous mixture in line 116 to form a combined steam 128. The chlorine dioxide, chlorine and steam mixture in line 128 may be treated to recover a chlorine dioxide solution, as described above with reference to FIG. 1.

Sodium sulphate is crystallized out of the reaction mixture in generator 120 and is recovered by line 130, generally for feed to the Kraft Mill recovery operation. The form of the sodium sulphate will depend upon the acidity of the reaction medium, as indicated above.

The chlorine dioxide produced by the process of the present invention may be used in bleaching operations wherein a pulp of cellulosic fibrous materials is contacted with aqueous chlorine dioxide or an aqueous solution containing chlorine dioxide and chlorine.

Modifications are possible within the scope of the invention.

I claim:

1. A process for the production of chlorine dioxide which comprises forming a first aqueous reaction medium containing sodium chlorate and hydrochloric acid in a first reaction zone by feeding to said first reaction zone hydrochloric acid and an aqueous solution of said alkali metal chlorate, the quantity of hydrochloric acid being sufficient to establish an acidity of about 0.05 to about 1N in said first aqueous reaction medium, heating said first aqueous reaction medium to effect reaction between said sodium chlorate and hydrochloric acid to generate thereby chlorine dioxide and chlorine, to evaporate water from said medium and to deposit solid sodium chloride in said first reaction zone, removing said chlorine dioxide and chlorine from said first reaction zone as a gaseous mixture consisting of said chlorine dioxide and chlorine and said evaporated water, recovering said solid deposited sodium chloride from said first reaction zone, forming a second aqueous reaction medium in a second reaction zone, said second aqueous reaction medium containing sodium chlorate, sodium chloride and sulphuric acid, feeding at least part of said deposited sodium chloride to said second reaction zone to constitute at least part of the sodium chloride in said second reaction medium, heating said second aqueous reaction medium to effect reaction between said sodium chlorate, sodium chloride and sulphuric acid in said second aqueous reaction medium to generate thereby chlorine dioxide and chlorine, to evaporate water from said second aqueous reaction medium and to form a sodium sulphate, removing said chlorine dioxide and chlorine from said second reaction zone as a gaseous mixture consisting of said chlorine dioxide and chlorine and said evaporated water, and recovering chlorine dioxide from the gaseous mixture removed from said first and second reaction zones.

2. The process of claim 1 wherein each of said first and second reaction zones is subjected to a reduced pressure and each of said reaction mediums is maintained substantially at its boiling temperature.

3. A process for the production of chlorine dioxide which comprises forming first aqueous reaction medium containing sodium chlorate and hydrochloric acid in a first reaction zone by feeding to said first reaction zone hydrochloric acid and an aqueous solution of said alkali metal chlorate, the quantity of hydrochloric acid being sufficient to establish an acidity of about 0.05 to about 1N in said first aqueous reaction medium, heating said aqueous reaction medium to effect reaction between said sodium chlorate and hydrochloric acid to generate thereby chlorine dioxide and chlorine and to evaporate water from said medium, removing said chlorine dioxide and chlorine from said first reaction zone as a gaseous mixture consisting of said chlorine dioxide and chlorine and said evaporated water, recovering by-product sodium chloride from said reaction zone, forming a second aqueous reaction medium in a second reaction zone, said second reaction medium containing sodium chlorate, sodium chloride and sulphuric acid, at least part of said latter sodium chloride being provided by said recovered by-product sodium chloride, generating chlorine dioxide and chlorine from said second reaction medium, recovering said latter chlorine dioxide and chlorine from said second reaction zone, and recovering chlorine dioxide from the gaseous mixtures removed from said first and second reaction zones.

4. The process of claim 3 wherein said first aqueous reaction medium is heated to effect reaction between said sodium chlorate and hydrochloric acid to generate thereby chlorine dioxide and chlorine, to evaporate water from said medium and to deposit sodium chloride in said first reaction zone, and said deposited sodium chloride is recovered from said first reaction zone as said by-product sodium chloride.

5. The process of claim 3 wherein said chlorine dioxide and chlorine generated in said second reaction zone is removed therein in gaseous admixture with an inert gas.

6. The process of claim 4 wherein the aqueous reaction medium in said second reaction zone has an acidity of from about 2 to about 4.8N.

7. The process of claim 1 wherein all of said solid deposited sodium chloride is passed to said second reaction zone and constitutes all of the sodium chloride requirement of said second reaction medium.

* * * * *